(12) United States Patent
Lee et al.

(10) Patent No.: US 11,752,466 B1
(45) Date of Patent: *Sep. 12, 2023

(54) SORBENT DISPERSION FOR TREATING POLLUTANTS

(71) Applicant: 3BI Holdings LLC, Dover, DE (US)

(72) Inventors: Brent Lee, Charlotte, NC (US); William Stevick, II, Hanahan, SC (US)

(73) Assignee: 3BI Holdings LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,718

(22) Filed: May 12, 2022

Related U.S. Application Data

(63) Continuation of application No. 16/739,730, filed on Jan. 10, 2020, now Pat. No. 11,331,621.

(60) Provisional application No. 62/791,954, filed on Jan. 14, 2019.

(51) Int. Cl.
    *B01D 53/10* (2006.01)
    *F23J 15/00* (2006.01)

(52) U.S. Cl.
    CPC ............ *B01D 53/10* (2013.01); *F23J 15/003* (2013.01); *B01D 2258/0283* (2013.01)

(58) Field of Classification Search
    CPC ........ B01D 53/10; B01D 53/34; B01D 53/38; B01D 53/74; B01D 53/83; B01D 2258/0283; B01D 2259/12; B01D 2259/128; B01J 4/00; B01J 8/004; B01J 8/0015; B01J 8/08; B01J 19/26; B01J 2204/00; B01J 2208/00752; F23J 15/00; F23J 15/003; F23J 15/02; F23J 2215/00; F23J 2900/00
    See application file for complete search history.

(56) References Cited

U.S. PATENT DOCUMENTS

| | | |
|---|---|---|
| 5,723,099 A | 3/1998 | Steinke |
| 8,801,841 B1 | 8/2014 | Balbarin et al. |
| 8,900,354 B2 | 12/2014 | Benson et al. |
| 8,961,912 B2 | 2/2015 | Allebach et al. |
| 9,149,759 B2 | 10/2015 | Dillon et al. |
| 11,331,621 B1 * | 5/2022 | Lee ......................... B01D 53/83 |
| 2010/0107638 A1 * | 5/2010 | Cartage ................... B01J 8/004 137/13 |
| 2015/0093295 A1 | 4/2015 | Quitadamo et al. |

FOREIGN PATENT DOCUMENTS

WO    2017037454 A1    3/2017

OTHER PUBLICATIONS

Jerry VanDerWerff, Nol-Tec Systems "How Dry Bulk Sorbent Injection Effectively Removes Stack Gas Pollutants" Air Pollution Control, CSC Publishing Inc., pp. 1-6 no date.

Nol-Tec Systems "SORB-1 Ec® Lance-Less Injection Technology" Environmental Solutions, pp. 1-2 no date.

Guisu Liu, Ph.D., "An Innovative Mixing Method to Lower the Cost of Operating DSI and ACI Systems," Issue 11 and vol. 119, Dec. 2, 2015, https://www.power-eng.com/2015/12/02/an-innovative-mixing-method-to-lower-the-cost-of-operating-dsi-and-aci-systems/ as downloaded on Apr. 23, 2020.

\* cited by examiner

*Primary Examiner* — Timothy C Vanoy

(74) *Attorney, Agent, or Firm* — Additon, Pendleton & Witherspoon, P.A.

(57) ABSTRACT

A system for dispersing sorbents to treat or remove flue gas pollutants can include a dispersion device with a venturi having an inlet, a throat, and an outlet. A sorbent supply can provide sorbent material to the dispersion device. A flue gas duct carrying flue gas streams traveling through the flue gas duct can include a port for attachment of the dispersion device to the port. In operational use, the dispersion device may be attached to the duct such that ambient air is drawn into the dispersion device and through the venturi. The air moving through the dispersion device can interact with and disperse the sorbent material into the duct for treating pollutants.

20 Claims, 7 Drawing Sheets

SORBENT DISPERSION FOR TREATING POLLUTANTS

CROSS REFERENCE TO PRIORITY APPLICATIONS

This application is a continuation of U.S. patent application Ser. No. 16/739,730 for Sorbent Dispersion for Treating Pollutants, (filed Jan. 10, 2020), now U.S. Pat. No. 11,331,621, which itself claims the benefit of U.S. Patent Application No. 62/791,954, filed Jan. 14, 2019, for Sorbent Dispersion for Treating Pollutants. Each of the foregoing commonly assigned patent applications is hereby incorporated by reference in its entirety.

FIELD OF INVENTION

The present disclosure relates to sorbent dispersion and, more specifically, to devices, systems, and related methods of sorbent dispersion for treating pollutants in flue gas streams.

BACKGROUND

Flue gases are produced when a fuel source is combusted in a combustion system (e.g., power plant boilers, incinerators, industrial furnaces, etc.). Flue gases contain pollutants that are harmful to the environment (e.g., sulfur dioxide, sulfur trioxide, mercury, chlorides, nitrogen oxide, etc.). Regulators in the United States and other countries have implemented standards requiring removal of contaminants (e.g., to specified levels) from gaseous streams that are released into the atmosphere.

Flue gas pollutants may be abated, mitigated, and/or removed in a variety of ways. One method involves the use of sorbent materials which are introduced into flue gas streams (e.g., lime, hydrated lime, activated carbon, trona, sodium bicarbonate, calcium carbonate, ammonia, urea, etc.).

Present devices, systems, and related methods for introducing sorbent materials into flue gas streams for mitigating pollutants include lance systems whereby lances extend through injection ports on flue gas ducts. Air-driven lines (e.g., convey lines) convey sorbent materials from storage locations (e.g., on-site storage tanks, containers, vats, etc.) to the lances which deliver the sorbent into flue gas traveling through the flue gas ducts. In some cases, lance systems may include blades or "wings" for creating turbulence in the duct, and/or may be used with installed in-duct baffles which create turbulence for distributing sorbent.

Lance systems, however, have various drawbacks. Given that the lance devices necessarily extend some distance into the interior portion of ducts (e.g., a series of respective lances positioned at varying locations/depths to provide uniform sorbent distribution), the lances are subject to high temperatures and other adverse conditions which limit their useful lifespan. Other in-duct components, for example components used to generate turbulence, are similarly affected. As a result, lance systems and static mixers (e.g., baffles) have high replacement costs and operational time is lost during the replacement/repair process.

Exposure to in-duct conditions can also promote clogging of sorbents within lances and/or residue buildup on in-duct components thereby leading to higher costs (e.g., maintenance costs, lost operating time, etc.). Lance systems may also fail to efficiently distribute sorbent which results in higher operational costs (e.g., greater volume of sorbent material needed for sufficiently effective treatment).

Other systems for providing sorbent materials into flue gas streams utilizes air movers (i.e., blowers) to generate air flows for moving sorbent materials supplied via convey lines into ducts carrying flue gas (e.g., at series of different positions about the duct). These systems may, in some implementations, lessen in-duct component exposure. Even so, these systems also have drawbacks.

For example, electromechanical components must be installed in order to generate the driven air flows (e.g., blowers, variable drives, etc.). Given that a series of such devices are typically installed for consistent distribution of sorbent material (e.g., based on the dimensions of the duct), costs are increased as the installed components wear or malfunction thereby necessitating repair/replacement and operational downtime. The components also require, at least, wiring into a facility's electrical grid (e.g., increasing installation complexity/cost) and providing an ongoing supply of electricity in order to run (e.g., increasing operational costs).

Therefore, a need exists for improved devices, systems, and related methods of sorbent dispersion for treating pollutants in flue gas streams, including but not limited to sorbent dispersion systems that reduce damage via in-duct conditions, that are cost-efficient with respect to effective sorbent usage, that require fewer installed components, and that require less ongoing maintenance and/or operational costs.

SUMMARY

Accordingly, in one aspect, the present disclosure embraces a system for removing pollutants by dispersing sorbent into flue gas traveling through a flue gas duct. The system may include a dispersion device having an upstream end portion at least partially open to surrounding ambient air; a venturi having a converging portion, a throat, and a diverging portion; and a downstream end portion configured for fluid communication with a flue gas duct when the dispersion device is attached to a port of the flue gas duct. The system may also include a sorbent supply operably attached to the dispersion device and configured for providing sorbent to the dispersion device; and a duct having the dispersion device attached via the port, the flue gas duct being configured for carrying flue gas which travels through the flue gas duct at a lower pressure than the ambient air. The system may be configured such that when the flue gas is traveling through the duct and the sorbent supply is providing the sorbent to the dispersion device, ambient air is drawn into the dispersion device at the upstream end portion of the dispersion device; moves through the venturi; interacts with the sorbent; and disperses the sorbent from the downstream end portion of the dispersion device into the flue gas duct.

In one embodiment, the sorbent may be provided so that it interacts with the air moving through the dispersion device at a location that is downstream of the diverging portion of the venturi.

In another embodiment, the sorbent supply may be attached to a sorbent pipe of the dispersion device, the sorbent pipe having an exit opening for providing the sorbent to the dispersion device.

In yet another embodiment, the exit opening of the sorbent pipe may be an organ pipe exit.

In yet another embodiment, the dispersion device may include a fluid injection inlet operably configured to receive fluid for supplementing a positive pressure differential between the ambient air and the flue gas.

In yet another embodiment, the fluid injection inlet may be configured to receive compressed air or steam generated from an external source for supplementing the positive pressure differential.

In yet another embodiment, the dispersion device includes a dispersion device housing at least partially enclosing the venturi.

In yet another embodiment, the upstream end portion of the dispersion device housing may include a hood portion including screen material concealing and covering, at least partially, the opening to surrounding ambient air.

In yet another embodiment, the dispersion device may include an adjustable regulator configured to control air flow through the dispersion device.

In another aspect, the present disclosure embraces a dispersion device for removing pollutants by dispersing sorbent into flue gas traveling through a flue gas duct. The device may include an upstream end portion at least partially open to surrounding ambient air; a venturi having a converging portion, a throat, and a diverging portion; a downstream end portion configured for fluid communication with a flue gas duct when the dispersion device is attached to a port of the flue gas duct; and a sorbent pipe configured for receiving sorbent provided from a sorbent supply, the sorbent pipe having an exit opening for providing the sorbent to the dispersion device. The dispersion device may be configured so that, when the dispersion device is attached to the flue gas duct, flue gas is traveling through the flue gas duct at a lower pressure than the ambient air, and the sorbent supply is providing the sorbent to the dispersion device, the ambient air: is drawn into the dispersion device at the upstream end portion of the dispersion device; moves through the venturi; interacts with the sorbent; and disperses the sorbent from the downstream end portion of the dispersion device into the flue gas duct.

In one embodiment, the exit opening of the sorbent pipe may be located downstream of the diverging portion of the venturi.

In another embodiment, the exit opening may include an organ pipe exit.

In yet another embodiment, the device may include a fluid injection inlet configured to receive fluid for supplementing a positive pressure differential between the ambient air and the flue gas.

In yet another embodiment, the device may include an adjustable regulator configured to control air flow through the dispersion device.

In yet another aspect, the present disclosure embraces a method for removing pollutants by dispersing sorbent into flue gas traveling through a flue gas duct using a dispersion device or a dispersion system. The method may include attaching a dispersion device to a flue gas duct via a port of the flue gas duct, the dispersion device including an upstream end portion at least partially open to surrounding ambient air; a venturi having a converging portion, a throat, and a diverging portion; and a downstream end portion in fluid communication with the flue gas duct. The method may also include providing sorbent to the dispersion device via a sorbent supply and dispersing, based upon flue gas traveling through the flue gas duct at a lower pressure than the ambient air, the sorbent via the ambient air, wherein the ambient air: is drawn into the dispersion device at the upstream end portion of the dispersion device; moves through the venturi; interacts with the sorbent; and disperses the sorbent from the downstream end portion of the dispersion device into the flue gas duct.

In one embodiment, the method includes attaching the sorbent supply to a sorbent pipe of the dispersion device having an exit opening for providing the sorbent to the dispersion device.

In another embodiment, the method includes supplementing a positive pressure differential between the ambient air and the flue gas via a fluid injection inlet of the dispersion device.

In yet another embodiment, the method includes adjusting air flow via a regulator of the dispersion device.

In yet another embodiment, the speed of the flue gas traveling through the flue gas duct is between 10 ft/sec and 100 ft/sec, and the temperature of the flue gas is between 200° F. and 800° F.

The foregoing illustrative summary, as well as other exemplary objectives and/or advantages, and the manner in which the same are accomplished, are further explained within the following detailed description and its accompanying drawings.

DETAILED DESCRIPTION

The present disclosure embraces systems, devices, and related methods of sorbent dispersion for treating pollutants in flue gas streams. Any type of sorbent (e.g., lime, hydrated lime, activated carbon, trona, sodium bicarbonate, calcium carbonate, ammonia, urea, etc.) may be utilized in varying states or forms (e.g., slurries, mixtures, dry powders, etc.).

Figure 1:
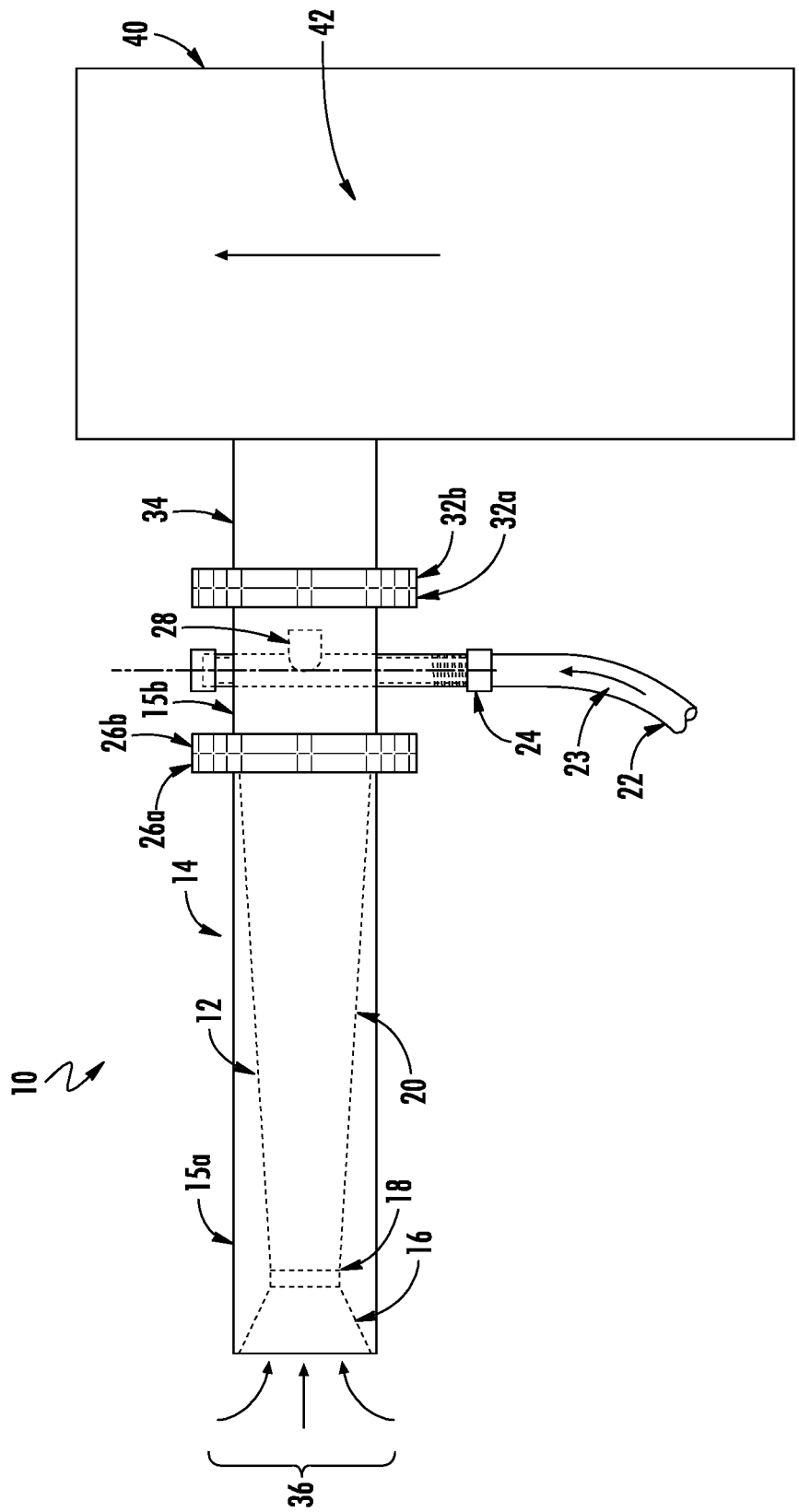
FIG. 1 schematically depicts an exemplary operating environment with an exemplary sorbent dispersion system for treating flue gas pollutants.

Certain exemplary components of a sorbent dispersion system 10 for treating flue gas pollutants are schematically depicted in FIG. 1 in an exemplary operating environment (e.g., with an exemplary flue gas duct 40 carrying gaseous streams 42).

The exemplary components include a sorbent dispersion device 14. The exemplary dispersion device 14 includes a venturi 12 positioned at least partially within a first portion 15a of a dispersion device housing. The venturi 12 includes a converging portion 16, a throat portion 18, and a diverging portion 20.

The inlet of the dispersion device (e.g., upstream air entrance portion) may be proximate the converging portion 16 (i.e., left-side as shown in FIG. 1) and at least partially open or accessible to surrounding ambient air (e.g., atmospheric air in or around a power plant or other combustion system facility). In some embodiments, the upstream air entrance adjoining or proximate converging portion 16 may be concealed (e.g., at least partially, fully, etc.) via a hood and/or shielded with screen material (not explicitly shown in FIG. 1).

In other embodiments, rather than being at least partially open to surrounding ambient air as illustrated in FIG. 1, the inlet or device entrance leading to the converging portion 16 may be in fluid communication with flue gas (e.g., via a pipe, tube, etc.); for example, in order balance pressure distribution within the dispersion device when flue gas traveling through the duct is at a positive pressure (e.g., as schematically depicted in FIG. 6 discussed below).

The throat portion 18 of venturi 12 is generally cylindrical, and the respective additional portions (e.g., 16, 20) of venturi 12 generally symmetrical extending in an axial direction therefrom. Other related venturi configurations, however, may be used (e.g., rectangular-type venturi, etc.). Although the converging, diverging, and/or throat portions may be shown or described as conical, respective wall sections may have curvature(s), for example.

A convey line 22 supplies sorbent material to the dispersion device as generally illustrated by arrow 23 in FIG. 1. Although not explicitly shown in FIG. 1, convey lines are typically air-driven (e.g., using blower packages) or pneumatic and include additional related technology and components for conveying sorbent materials 23 from on-site storage. The related components of convey line 22 depicted for use in the context of system 10 may be already installed in a facility (e.g., previously used in lance-type sorbent distribution systems).

In the exemplary embodiment depicted at FIG. 1, convey line 22 connects to a sorbent inlet pipe 24 of housing portion 15*b* (e.g., via a threaded fitting, quick-connect, or other type of internal/external connection). Thereafter, during operation, sorbent material is routed from sorbent pipe fitting inlet 24 to an exit at opening 28 (e.g., shown as a tee opening in the exemplary embodiment).

Exemplary dispersion device housing portions 15*a* and 15*b* are attached (e.g., bolted) at corresponding or mating flange portions 26*a*, 26*b*. Housing portion 15*b* is attached (e.g., bolted) to port 34 of flue gas duct 40 at respective flange portions 32*a*, 32*b*. Port 34 is generally a "stove pipe" type inlet/opening (e.g., ports previously used for lace-type dispersion systems) located at points where sorbent is introduced in the flue gas duct 40 to treat flue gas streams 42 traveling therein.

In the exemplary embodiment depicted at FIG. 1, flue gas duct 40 is a combustion system duct (additional components of which are not explicitly shown in FIG. 1) configured for transporting flue gas traveling as generally shown via arrow 42. The depicted arrangement is for the purpose of illustration only, and the present disclosure is not limited to any specific type of combustion system, duct configuration/flow-direction that may be used for carrying flue gas, and/or dispersion device 14 positional arrangement(s) with respect to combustion system duct inlets/ports (e.g., top, bottom, angular positioning, etc.). In some respects, and not by way of limitation, the present disclosure is applicable to flue gas duct arrangements carrying flue gas streams traveling at speeds ranging from in or around 10 to 100 feet per second (ft/sec), or 3 to 30 meters per second (m/s), and at temperatures ranging from in or around 200 degrees to 800 degrees Fahrenheit (° F.), or 93 to 427 degrees Celsius (° C.).

Although not explicitly shown FIG. 1, combustion systems (e.g., systems including duct 40 and related components) may generally include equipment supporting flue gas movement at a proper rate, temperature, etc., in view of the respective facilities' particular specifications (e.g., fans, blowers, heaters, control equipment, etc.) for corresponding facility operation.

During operation of the exemplary system 10 in the exemplary operating environment schematically depicted in FIG. 1, lower pressure of flue gas 42 traveling through the flue gas duct 40 results in a natural adjustment acting as a vacuum such that air 36 (e.g., ambient air, atmospheric air at around a temperature of 59 degrees Fahrenheit or 15 degrees Celsius, etc.) is drawn (e.g., pulled, sucked, moved, etc.) into the upstream side or portion of dispersion device 14 and enters venturi 12 about converging portion 16. Air flows 36 moving through the venturi 12 may be accelerated by the reduced diameter of the converging portion 16 and throat 18, and decelerated as the diameter increases at the diverging portion 20 (e.g., larger volume lower velocity air flows). The Bernoulli equation generally describes the relationship between velocity and pressure.

The accelerating and decelerating air flow 36 (e.g., turbulence kinetic energy) moving through the dispersion device facilitates interactions between sorbent material 23 entering the air flow at exit opening 28, such that sorbent is dispersed from the downstream side or portion (e.g., right-side or portion as shown in FIG. 1) of the dispersion device 14 into the flue gas duct 40 in a manner yielding high efficiency for treating the flue gas pollutants in the gaseous streams 42 (e.g., more uniform, homogenous distribution across the duct cross-section for treating pollutants, avoiding zones of concentrated distribution, etc.). As is generally known, a greater sorbent residence time within the flue gas stream 42 yields better treatment outcomes. The greater dispersion area of sorbent that is generated (e.g., a plume, cloud, billow, etc.) by the present disclosure, however, moderates the need for higher residence time thereby increasing efficiency in comparable injection locations (e.g., fifty-percent less sorbent usage in comparison to lance-type systems that are limited to lesser dispersion area).

FIG. 2 is a perspective, exterior view of an exemplary dispersion device 14 that may be used in the context of system 10 and the exemplary operating environment schematically depicted in FIG. 1. FIG. 2, however, illustrates a hood portion 15*c* which conceals the upstream ambient air inlet or entrance of dispersion device 14 and internal venturi 12 (e.g., a weather hood for outdoor applications, a safety hood for protecting workers, etc.). Hood portion 15*c* may further include screen material covering or shielding, for example, an underside opening (not explicitly shown in FIG. 2).

FIG. 3 schematically depicts another exemplary dispersion device 114 configuration that may be used in the context of, for example, system 10 and the exemplary operating environment shown in FIG. 1. Related reference numbers of FIG. 3, as well as the related reference numbers of the further embodiments discussed below (e.g., with respect to FIGS. 4-6), respectively represent similar device components as previously described with regard to FIGS. 1 and 2 (e.g., venturis 12, 112; sorbent supplies 23, 123, etc.). As such, certain components similar and/or related to those previously described will not be discussed in detail with an understanding that the prior discussions remain generally applicable.

FIG. 3, however, illustrates examples of certain changed or supplemental dispersion device/system features that may be utilized in varying combinations (e.g., for improving performance, treatment, and/or safety characteristics when used and/or operated in the context of system 10).

For example, venturi 112 may be of a different size or style. Venturi 112 may also be positioned at a varying depth with respect to the port 34 inlet or access point of the flue gas duct 40, and in and/or off-center but parallel to the centerline of the port 34. In this regard, exemplary dispersion device 114 includes flange 126a for attaching to port 34 (e.g., bolting to flange 32b) of a flue gas duct. Thus, the position of flange 126a is "adjustable" with respect to internal components of the dispersion device 114 (e.g., internal venturi 112 and respective component portions).

Figure 3:
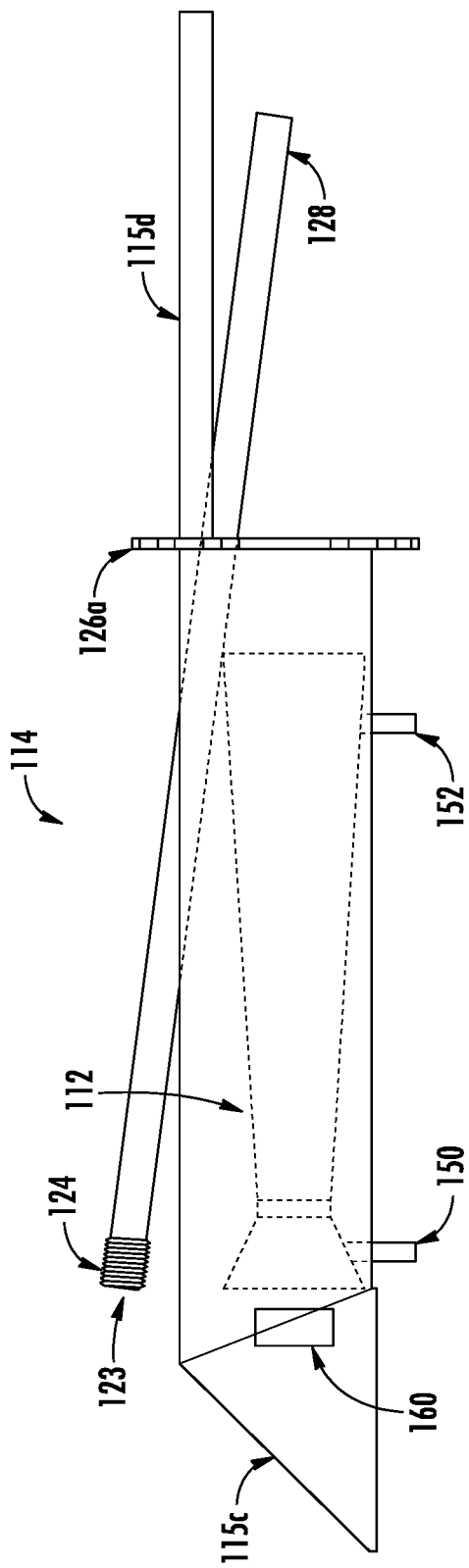
FIG. 3 schematically depicts another exemplary dispersion device.

Moreover, as generally depicted in FIG. 3, sorbent material may be supplied from a convey line as illustrated by arrow 123 based upon attachment of a convey line (additional and/or related components of which are not explicitly shown) to, for example, inlet sorbent pipe fitting 124. Thus, during operational use, sorbent material 123 enters the generated air flows moving through and exiting venturi 112 (e.g., as described above) via pipe exit 128 at an angle. In this regard, sorbent could be moved or driven, to some extent, by convey air carrying the sorbent 123 in the convey line to pipe exit 128. Exit 128 may, in some embodiments, encompass different designs and/or mechanisms (e.g., impact plates, removable/adjustable tips, etc.) facilitating sorbent release/distribution into the air flow exiting venturi 112 at the downstream side of the dispersion device (e.g., creating cavitation, spray patterns, cone spray angles, preventing undesirable sorbent buildup at the exit, etc.) based on specific facility requirements and/or use case scenarios.

Dispersion device 114 can also include an optional fluid injection pipe inlet 150 (e.g., having a pipe fitting or other adapter allowing connection). Inlet 150 may, in some embodiments, be used as a connection point to supplement a pressure differential with respect to the pressure of flue gas 42 traveling through the duct 40 and ambient air moving through the dispersion device. For example, a facility may have available sources for providing supplemental air flows (e.g., compressed air), heated air flows, steam, and/or other modes for facilitating natural adjustment to draw air into the upstream side of dispersion device 114 and venturi 112 which moves through the device for dispersing sorbent into the duct.

FIG. 3 also depicts an optional pipe inlet 152 of dispersion device 114 which may, in some embodiments, be included for use as an auxiliary port allowing, for example, connection of various sensors (e.g., for conducting temperature readings, pressure measurements, etc.) which are not explicitly shown.

Alternatively, or additionally, the hood 115c or other portion of dispersion device 114 may include an adjustable regulator 160 (e.g., restrictor plate, slide gate, iris valve, etc.) that may be used to vary the amount of upstream air drawn or moving into the venturi 112 (e.g., increasing/decreasing flow rate, velocity, etc., as may be advantageous in some applications).

Figure 3A:
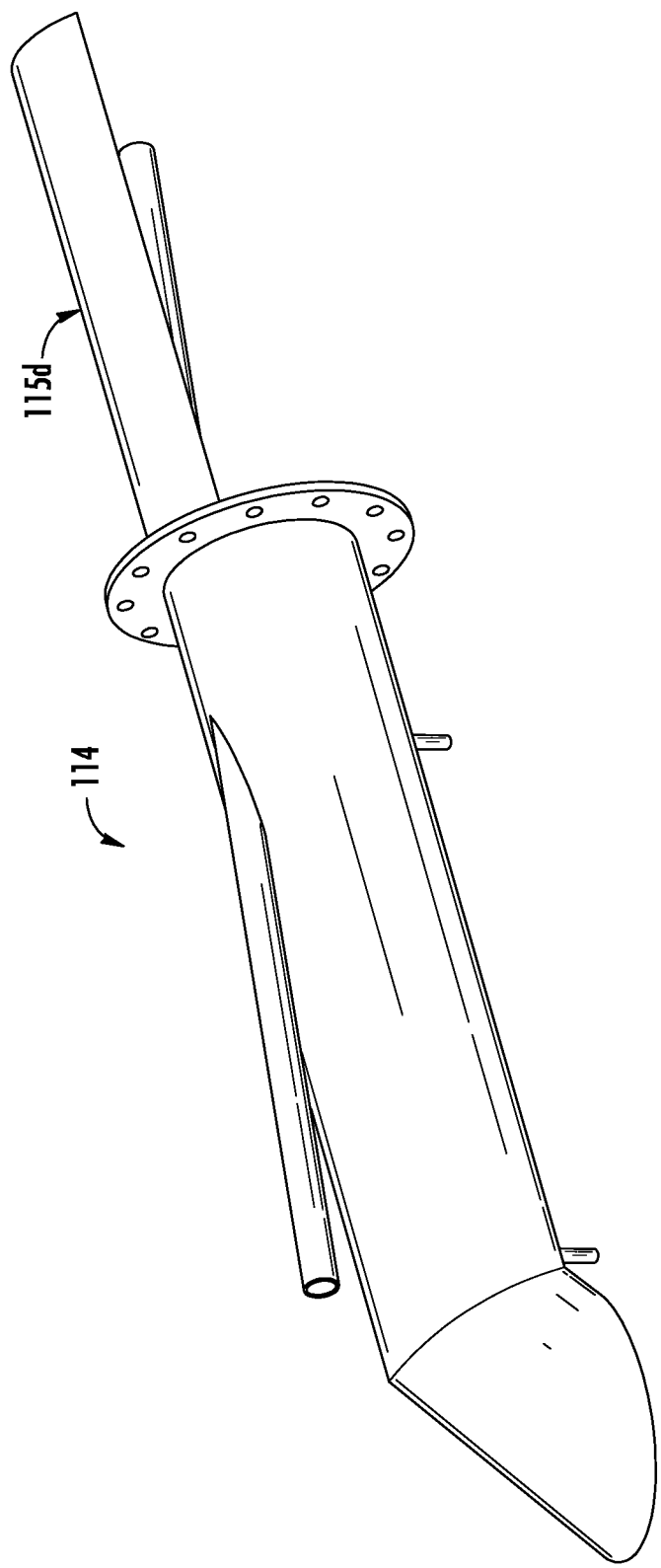
FIG. 3A depicts a perspective exterior view of the exemplary dispersion device of FIG. 3.

FIG. 3A is a perspective, exterior view of dispersion device 114 schematically depicted in FIG. 3. FIG. 3A illustrates pipe shield portion 115d which may be inserted into port 34 in the context of, for example, the exemplary system 10 and operating environment of FIG. 1. In other embodiments, similar/related shield portion arrangements may be used for supporting heat exchange system components such as coils (e.g., as described below with respect to the exemplary heating system embodiment schematically depicted in FIG. 5).

Figure 4:
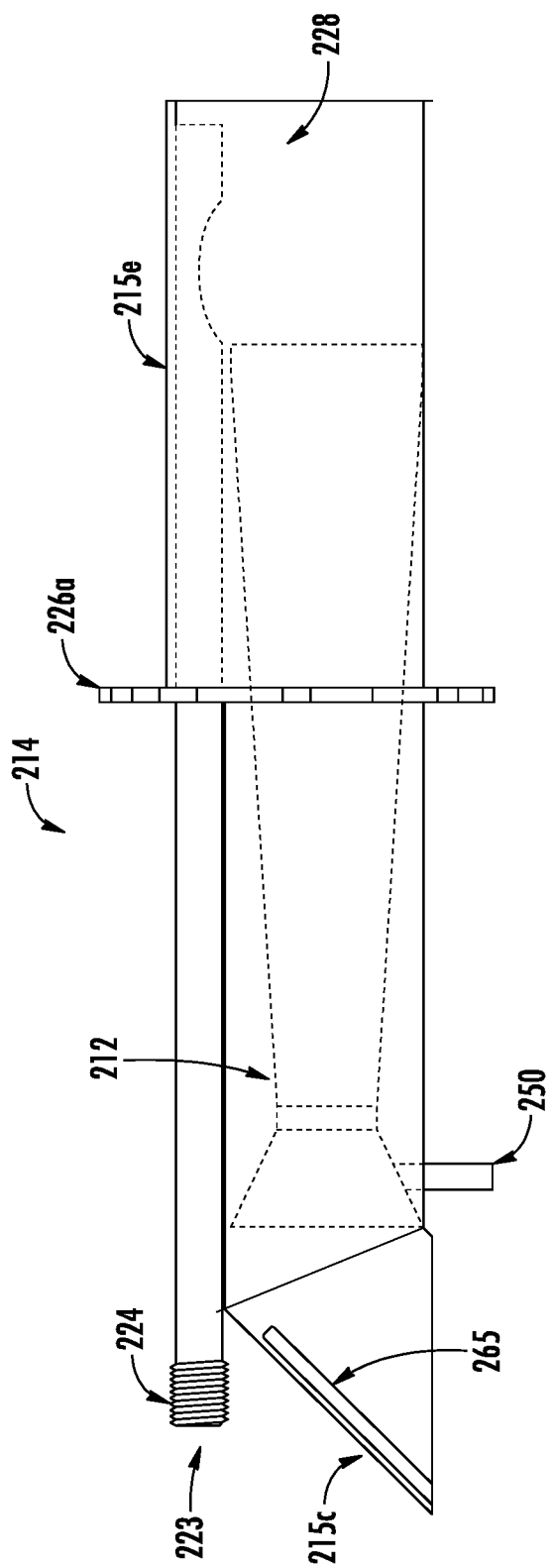
FIG. 4 schematically depicts yet another exemplary dispersion device.

FIG. 4 schematically depicts another exemplary dispersion device 214 configuration that may be used in the context of, for example, the exemplary system 10 and operating environment of FIG. 1. FIG. 4 further illustrates certain changed or supplemental embodiment features that may be utilized in varying combinations (e.g., for improving performance, treatment, and/or safety characteristics when implemented in various arrangements).

For example, as depicted in FIG. 4, venturi 212 is positioned at a different depth or positional arrangement with respect to flange 226a (e.g., "adjustable" positioning with respect to the port). Moreover, as shown in FIG. 4, sorbent material may be supplied as illustrated by arrow 223 at pipe inlet 224 to enter the downstream air flow exiting venturi 212 via an "organ pipe" exit area 228 (e.g., an exit point/shape similar to that of a pipe organ instrument). Dispersion device 214 also may include an inlet pipe 250 similar to inlet pipe 150 of FIG. 3 and for the exemplary uses discussed above (e.g., supplementing pressure differential).

Moreover, hood portion 215c (and/or other housing portions of dispersion device 214) may include backdraft safety components which are schematically depicted in FIG. 4 at reference number 265. A backdraft or flow reversal preventer 265 of exemplary dispersion device 214 can automatically deploy in order to prevent flue gas reversal (e.g., flaps, check valves, and/or related components arranged to prevent flue gas from venting out of device 214). For example, in one embodiment preventer 265 may be hinged at one end such that it remains open during normal operation (as shown in FIG. 4) but such that it closes an underside opening of hood portion 215c due to the force of gravity when the combustion system is turned-off (the "off" configuration is not explicitly shown in FIG. 4). In this way, facility and worker safety may be appropriately maintained (e.g., in the case of combustion system malfunctions, component failures, power losses, earthquakes, etc.).

Figure 4A:
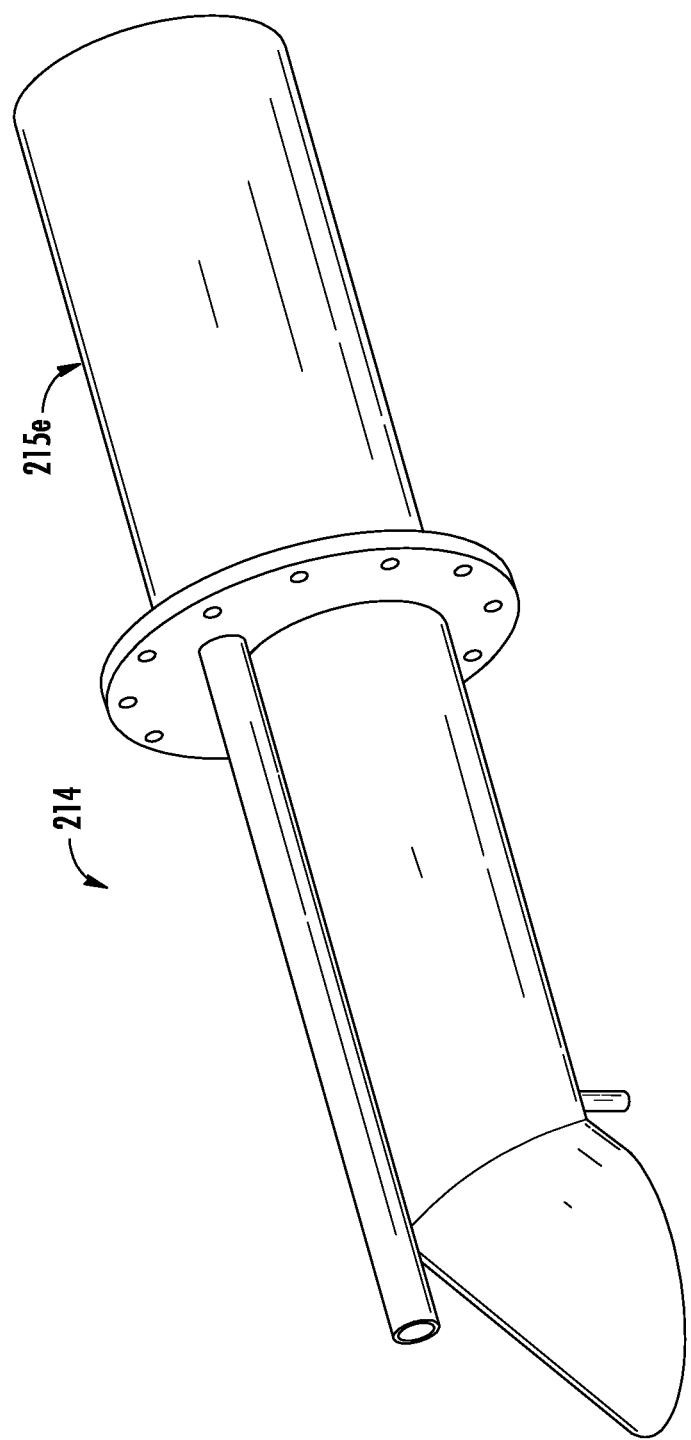
FIG. 4A depicts a perspective exterior view of the exemplary dispersion device of FIG. 4.

FIG. 4A is a perspective, exterior view of dispersion device 214 schematically depicted in FIG. 4. FIG. 4A illustrates housing portion 215e surrounding part of the organ pipe and its exit portion 228 (e.g., portion 215e may, for example, be inserted into port 34 in the context of system 10).

Figure 2:
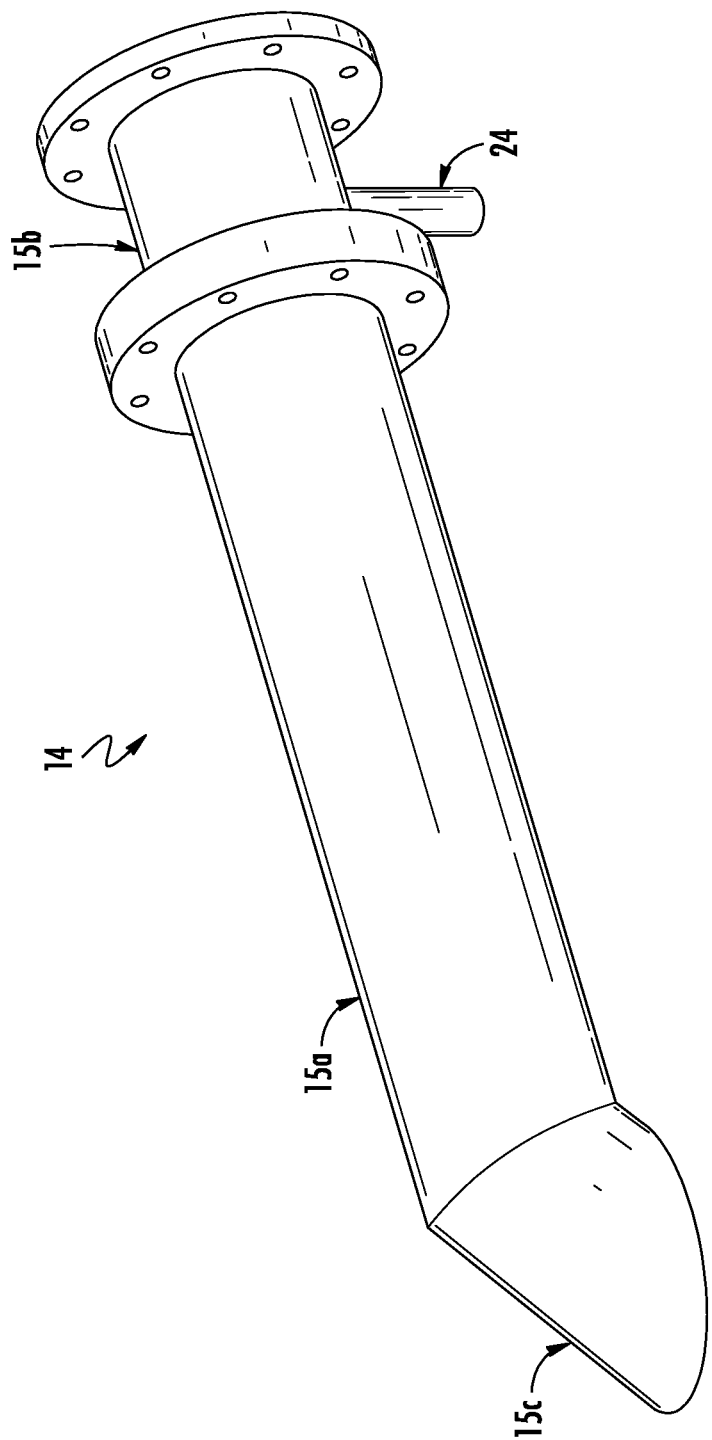
FIG. 2 depicts a perspective exterior view of an exemplary dispersion device.
Figure 5:
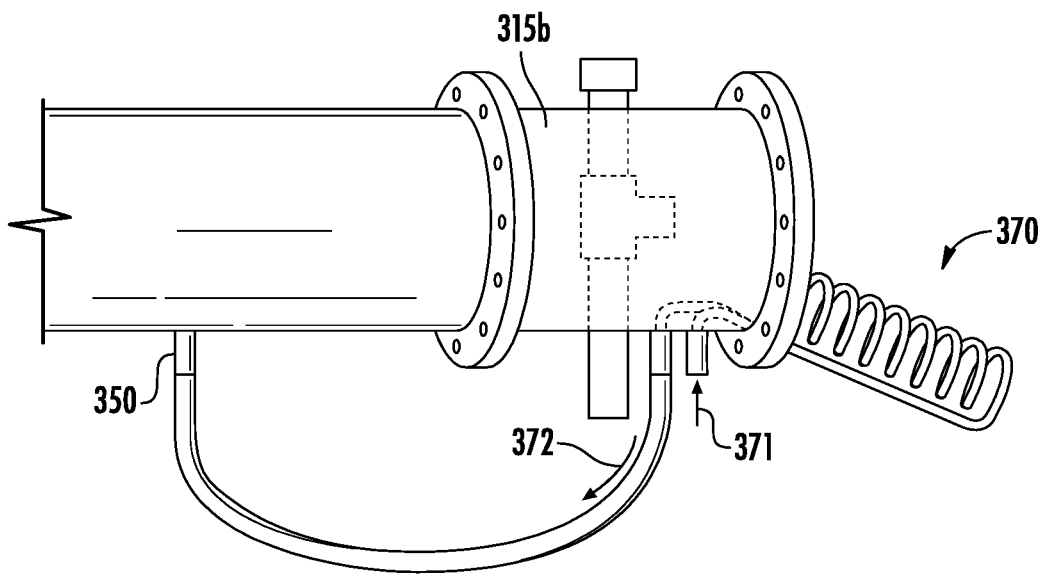
FIG. 5 schematically depicts an exemplary dispersion device heat exchange system.

FIG. 5 schematically depicts an exemplary heat exchange system 370 that may be used with dispersion device and system embodiments of the present disclosure (e.g., in the context of system 10). As shown in FIG. 5, heat exchange system 370 is illustrated with a housing portion 315b which is similar to housing portion 15b shown in FIGS. 1 and 2, but modified arrangements may be used as appropriate for other dispersion device/system embodiments of the present disclosure (e.g., shield-type arrangements as generally described herein).

In operational use (e.g., with a dispersion device in the context of system 10), in-duct flue gas streams may be used to heat air (and/or another supplied mixture of gas, fluid, slurry, etc.) moving/supplied from convey lines as generally illustrated via arrow 371 through coils of heating system 370. The heated air or other mixture exiting the coils, as illustrated via arrow 372, can be routed to inlet pipe 350, which may be similar in form/function to, for example inlet pipes 150, 250 of FIGS. 3 and 4 discussed above. Notably, the heated air or other mixture 372 may facilitate air being drawn into and through the dispersion device and internal venturi (e.g., venturi action) for dispersing the sorbent.

In some examples, heat exchange system 370 may generate steam that is supplied/mixed with sorbent for dispersion into the combustion system duct. In other aspects relating to heating system 370, other mixtures of various forms, including for example heated water (e.g., steam, moisture, etc.), ammonia, urea slurry, etc., can be supplied/ heated to improve pollutant treatment characteristics (e.g., for treating oxides of nitrogen produced during natural gas combustion).

Figure 6:
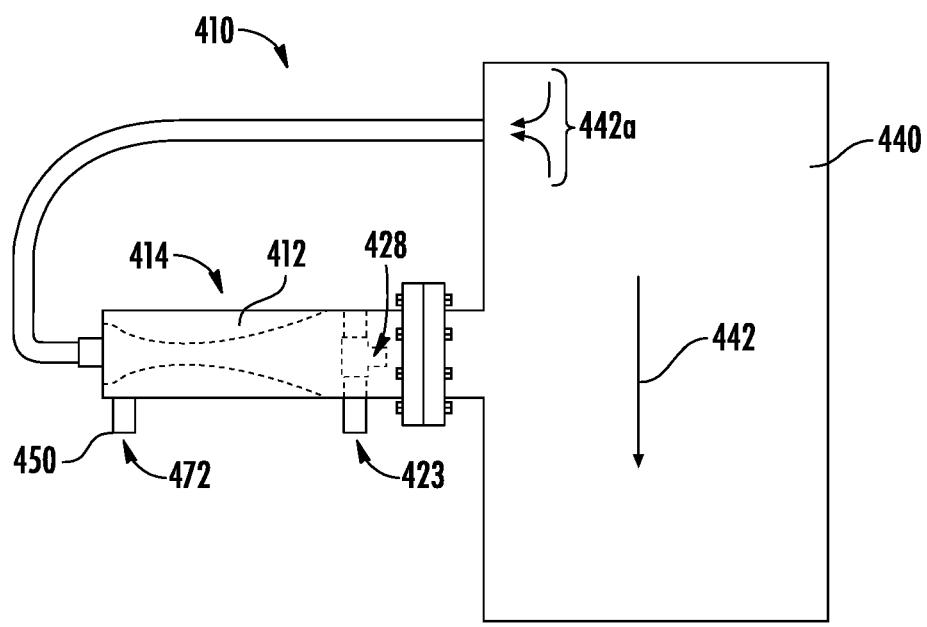
FIG. 6 schematically depicts another exterior operating environment with an exemplary sorbent dispersion system for treating flue gas pollutants.

Alternatively, and with reference to exemplary system 410 schematically depicted at FIG. 6, flue gas stream portions 442a of the primary flue gas stream 442 traveling through duct 440 (e.g., in the direction of arrow 442) may be recirculated into a dispersion device 414. Thus, rather than being at least partially open to surrounding ambient air (e.g., as shown in FIG. 1), the inlet of venturi 412 may be in fluid communication with upstream flue gas 442 (e.g., via a pipe, tube, etc.) to accept flue gas stream portions 442a. This arrangement may be beneficial in balancing out the pressure distribution within the dispersion device 414 with respect to duct 440 in certain (generally atypical) combustion systems that operate with positive pressure (e.g., at a positive pressure of ten bars).

Dispersion device 414 can also include an inlet pipe 450 (e.g., similar in form/function to, for example, inlet pipes 150, 250, and 350). Upon achieving a generally balanced (i.e., "zeroed") pressure distribution within the dispersion device 414 with respect to duct 440 (e.g., a generally equal pressure of ten bars), a positive pressure may be implemented via inlet 450 (e.g., supplying steam 472 into inlet 450). In this manner, natural adjustment draws air/gas into venturi 412, conveyed sorbent material 423 enters the air/gas flow at opening 428, and sorbent is dispersed into the duct 440 with high distribution efficiency for treating pollutants.

In summary, and as illustrated in the exemplary configurations depicted and described above, improved dispersion devices of the present disclosure may encompass a number of variations (e.g., improving performance, treatment, and/or safety characteristics for combustion systems). Notably, intake variations are contemplated: air intake configuration of dispersion device venturi may be unrestricted for atmospheric air; dispersion device may intake flue gas or exhaust from other processes; and/or dispersion device may intake air at a tangent or angle to generate in-port turbulence.

Further, venturi design-related variations are contemplated: different sizes and/or styles of venturi can be used; venturi may be positioned at varying depths with respect to the port (e.g., extending into the port "stove pipe" closer to the interior of the flue gas duct) and/or may be positioned at angle to, off-center but parallel to, or on centerline of the port; blades, propellers, grooves, and/or rifling may be added/incorporated to generate "swirl" or create a vortex; and materials used for construction can be varied.

In other aspects, different modes are contemplated for supplementing natural pressure adjustment to draw air/gas into dispersion-devices for dispersing the sorbent: multiple venturis can be used in sequence; compressed air from a common source within a facility and/or from dedicated compressors could be added (e.g., via optional inlet pipe 150); sorbent convey air could be used to enhancement air movement; steam and/or other mixtures from a common source within a facility could be added/mixed for dispersion (e.g., water vapor, ammonia, urea slurry, mixtures thereof, etc.); and/or steam generated by a heating coil module/system could be added/mixed for dispersion.

In further aspects, various adjustment, safety, and/or measuring mechanisms such as regulators, valves, and/or sensors are contemplated (e.g., pressure differential/vacuum feedback control, inlet restrictor plate, inlet slide gate, backflow preventer, temperature sensor, etc.).

In still other aspects, different variations for introducing the sorbent into dispersion devices of the present disclosure are contemplated, including but not limited to: exits adjusted by angle and depth; tee-bend exits; slanted straight pipe; organ pipe exits, pipe exits having angled termination cuts (e.g., 45 degree angle); incorporating impact plates and/or removable/adjustable tips (e.g., creating cavitation, spray patterns, cone spray angles, preventing undesirable sorbent buildup at the exit, etc.); and/or different exit diameters.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system for removing pollutants by dispersing sorbent into flue gas traveling through a flue gas duct, the system comprising:
- a dispersion device, the dispersion device comprising:
  - an upstream portion at least partially open and/or accessible to ambient air; and
  - a downstream portion in fluid communication with a flue gas duct, the flue gas duct being configured for carrying flue gas which travels through the flue gas duct at a lower pressure than the ambient air; and
- a sorbent supply operably attached to the dispersion device and configured for providing sorbent to the dispersion device;
- wherein the system is configured so that, in response to the flue gas traveling through the duct and the sorbent supply providing the sorbent to the dispersion device, a portion of the ambient air:
  - is drawn into the upstream portion of the dispersion device;
  - moves through the dispersion device;
  - interacts with a portion of the sorbent; and
  - disperses the portion of the sorbent from the downstream portion of the dispersion device.

2. The system of claim 1, wherein:
- the dispersion device comprises a venturi, the venturi having a converging portion, a throat, and a diverging portion; and
- the system is configured so that the portion of the ambient air moves through the venturi.

3. The system of claim 2, wherein the system is configured so that the portion of the sorbent interacts with the portion of the air moving through the dispersion device at a location that is downstream of the diverging portion of the venturi.

4. The system of claim 1, wherein the sorbent supply is attached to a sorbent inlet of the dispersion device, the sorbent inlet having an exit opening configured for providing the sorbent to the dispersion device.

5. The system of claim 4, wherein the exit opening of the sorbent inlet comprises an organ pipe exit.

6. The system of claim 1, wherein the dispersion device comprises a fluid injection inlet operably configured to receive fluid for supplementing a positive pressure differential between the ambient air and the flue gas.

7. The system of claim 6, wherein the fluid injection inlet is configured to receive compressed air or steam generated from an external source for supplementing the positive pressure differential.

8. The system of claim 1, wherein the dispersion device comprises a hood.

9. The system of claim 1, wherein the dispersion device comprises an adjustable regulator configured to control air flow through the dispersion device.

10. A dispersion device for removing pollutants by dispersing sorbent into flue gas traveling through a flue gas duct, the device comprising:
an upstream portion at least partially open to ambient air;
a downstream portion configured for fluid communication with flue gas traveling through a flue gas duct at a lower pressure than the ambient air; and
a sorbent inlet configured for receiving sorbent and providing the sorbent to the dispersion device;
wherein the dispersion device is configured so that, when the dispersion device is in fluid communication with the flue gas and is receiving the sorbent, a portion of the ambient air:
is drawn into the upstream portion of the dispersion device;
moves through the dispersion device;
interacts with a portion of the sorbent; and
disperses the portion of the sorbent from the downstream portion of the dispersion device.

11. The device of claim 10, comprising a venturi, the venturi having a converging portion, a throat, and a diverging portion;
wherein the device is configured so that the portion of the ambient air moves through the venturi.

12. The device of claim 11, wherein the sorbent inlet comprises an exit opening downstream of the diverging portion of the venturi.

13. The device of claim 12, wherein the exit opening comprises an organ pipe exit.

14. The device of claim 10, comprising a fluid injection inlet configured to receive fluid for supplementing a positive pressure differential between the ambient air and the flue gas.

15. The device of claim 10, comprising an adjustable regulator configured to control air flow through the dispersion device.

16. A method for removing pollutants by dispersing sorbent into flue gas traveling through a flue gas duct, the method comprising:
attaching a dispersion device to a flue gas duct, the dispersion device comprising:
an upstream portion at least partially open to ambient air; and
a downstream portion in fluid communication with the flue gas duct;
providing sorbent to the dispersion device; and
responsive to the providing of the sorbent, and to flue gas traveling through the flue gas duct at a lower pressure than the ambient air, dispersing a portion of the sorbent via a portion of the ambient air.

17. The method of claim 16, wherein:
the dispersion device comprises a venturi, the venturi having a converging portion, a throat, and a diverging portion; and
the portion of the ambient air:
is drawn into the upstream portion of the dispersion device;
moves through the dispersion device;
interacts with the portion of the sorbent; and
disperses the portion of the sorbent from the downstream portion of the dispersion device.

18. The method of claim 16, comprising attaching a sorbent supply to a sorbent inlet of the dispersion device, the sorbent inlet comprising an exit opening for providing the sorbent to the dispersion device.

19. The method of claim 16, comprising supplementing a positive pressure differential between the ambient air and the flue gas via a fluid injection inlet of the dispersion device.

20. The method of claim 16, comprising adjusting air flow of the dispersion device via a regulator of the dispersion device;
wherein the flue gas is traveling through the flue gas duct at a speed between 10 ft/sec and 100 ft/sec, and the flue gas is at a temperature between 200° F. and 800° F.

* * * * *